United States Patent Office 3,590,121
Patented June 29, 1971

3,590,121
EFFERVESCENT DENTAL COMPOSITIONS
Thomas Schiff and Kenneth J. Shaver, St. Louis, Mo., assignors to Monsanto Company, St. Louis, Mo.
No Drawing. Filed Feb. 5, 1969, Ser. No. 796,910
Int. Cl. A61k 7/16, 19/00
U.S. Cl. 424—50                                  1 Claim

ABSTRACT OF THE DISCLOSURE

This invention relates to effervescent dental compositions containing enzymes, for example, an effervescent dental tablet containing an enzyme mixture produced by *Bacillus subtilis*.

---

This invention relates to effervescent compositions and more particularly to effervescent dental compositions containing enzymes.

Undesirable conditions resulting from an accumulation of plaque in the oral cavity are well-recognized. Plaque is a soft mass which adheres to the surface of the teeth and gums, and is generally made up of bacteria, proteins, starches and carbohydrates. Attempts to control plaque formation have been numerous. Enzymes such as proteases, lypases, amylases or mixtures thereof, as is well-known in the art, have been found to be effective in preventing or reducing plaque. When used in the mouth, these enzymes break down the various components of plaque.

A mouthwash would be a particularly good means of bringing the enzyme into contact with the teeth and gums, because of its ease of use and its effective distribution of the enzyme to all areas of the oral cavity. However, when enzymes are combined with commercially available mouthwashes, often they lose their acivity during normal shelf life periods due to the aqueous environment or incompatabilities with other ingredients. Therefore, a dental composition containing an enzyme that remains active till use, and at which time the enzyme can be brought into contact with the oral cavity by means of a mouthwash would be an advancement in the art.

In accordance with this invention, it has been found that an enzymatically active substance will remain substantially stable in an effervescent dental composition containing an acidulating agent, a carbonate containing material until utilized in the mouth. Moreover, the compositions dissolve rapidly and suitable flavoring and sweetening agents may be added to produce a pleasantly flavored product. Additionally, a composition containing the optimum dosage per application of enzymatically active substance may be prepared in the form an effervescent tablet.

Enzymatically active substance as used in this application refers to a substance composed of a single enzyme or a mixture of enzymes. Enzymatically active substances useful in this invention may be obtained from animals, plants or micro-organisms. It is preferred to use enzymatically active substances of a microbial origin, and more preferred to use those of a bacterial origin as they can be economically produced in appreciable amounts. These bacteria produce either a single enzyme or a mixture of enzymes.

Examples includes Bacillus, Aspergillus or Streptomyces micro-organism including various *B. subtilis* strains such as *B. subtilis* strain NRRL B-3411 (U.S. Department of Agriculture Collection, Peoria, Ill.) *B. subtilis* strain NRRL 644, *B. subtilis* strain IAM 1523 (Japanese Culture Collection) all of which produce a mixture of protease and amylase. Other organisms include *B. thermoproteolyticus*, *Streptomyces griseus*, *Aspergillus oryzae*, *Streptomyces rectus*, *Streptomyces naraensis* and *B. subtilis* var *amylosacchariticus* all of which produce either a mixture of protease and amylase or only neutral protease. *Streptomyces griseus* strain K-1 produces a predominantly neutral protease.

Neutral protease as used in this application refers to a metallo-enzyme which has its optimum activity at a pH of about 6 to about 8, is inhibited by metal-chelating agents but unaffected by such inhibitors as di-isopropyl fluoro phosphate (DFP) and hydrolyses substrates such as furylacryloylglycyl-L-leucine amide (FAGLA), but does not possess activity against esters such as P-nitrophenyl acetate or N-CBZ-glycine P-nitro-phenyl ester. A metallo enzyme is one containing metal essential for activity. Alkaline protease as used in this application refers to an enzyme which has its optimum activity at a pH of about 8 to about 11, is inhibited by DFP, but not by metal chelating agents and possess activity against esters such as N-CBZ-glycine p-nitro phenyl ester, but not against FAGLA.

A particularly good source of the enzymatically active substance is an enzyme mixture produced by *Bacillus subtilis* strain NRRL B-3411. A process for producing this organism and enzyme therefrom is described in U.S. Pat. 3,031,380. The enzymatically active substance produced by this organism has been found generally to consist of two proteases, neutral protease, alkaline protease, and amylase. There are generally about 700 thousand to about 2 million casein units of neutral protease activity per gram of isolated solids and about 250 thousand to about 500 thousand casein units of alkaline protease activity per gram as determined by a casein digestion technique (hereinafter to be described). There are about 300 thousand to about 500 thousand units of amylase as determined by the Bernfeld method (hereinafter to be described). As pointed out in the cited patent, the relative proportions of protease to amylase will vary depending on the exact conditions of growth of the micro-organism, but it has been found that the neutral and alkaline protease and the amylase will be produced, in at least some amounts, almost regardless of changes in the culture medium and other conditions of growth of the micro-organism.

Various analytical methods are available for determining enzyme activity, for example, protease activity can be determined by well-known protein digestion methods using protein substrates such as casein, hemoglobin, bovine serum albumin or gelatin. According to such tests, a protease catalyzes the hydrolysis of a protein (for example, casein) for a certain period of time under controlled conditions of temperature, pH and substrate concentration; the reaction is stopped by addition of trichloroacetic acid, and the solution filtered. The solubilized fragments in the filtrate are determined either by measurement of absorbance in the ultraviolet range or rendered visible by reaction with Folin phenol reagent, and absorbance measured in the visible range and enzyme activity expressed in terms of tyrosine equivalents. This method is more fully described in the Journal of General Physiology, 30 (1947), 291 and in Methods of Enzymology, 2, New York: Academic Press 1955, 33.

In this application when neutral protease activity is expressed in casein units, it is understood that such activity is determined at pH 7, and when alkaline protease is expressed in casein units, it is understood that such activity is determined at pH 10.

Other methods for determining protease activity make use of low molecular weight substrates in spectrophotometric assays, for example, the substrate FAGLA is specific for neutral protease and is used to determined neutral protease activity as described in Biochemical Biophysical Research Communications, 32, 326 (1968).

Amylase activity is generally determined by the well-known dinitrosalicyclic acid method of Bernfeld as described in Methods of Enzymology, Academic Press, 1955, II, p. 949. According to this test, amylase catalyzes the hydrolysis of the starch to reduce sugar at a given time and temperature. The reaction is stopped and color developed by the addition of dinitrosalicyclic acid. The optical density of the solution is estimated from a standard curve prepared with known amounts of maltose hydrate. In this application, when units of activity of amylase are stated, it is understood that the Bernfeld technique is employed to determine such activity.

The neutral proteases as a group possess different specificity from the alkaline proteases as a group. For example, alkaline proteases possess esterase activity due apparently to their mechanism of action and not to their pH optimum while neutral proteases do not. Tests demonstrating this fact are more fully described in Arch Biochem. Biophys., 123 (1968), 572. Various techniques can be utilized to separate different components of mixtures, for example, neutral protease may be separated from enzyme mixtures, by ion exchange chromatography as described in the Journal of Biological Chemistry, 239 (1964), 3706, and in Agr. Biol. Chem., 30 (1966), 651. Another method is disclosed in copending application No. 752,460, filed Aug. 14, 1968, and assigned to the same assignee as this application. The starting material for this technique is a water clear fermentation beer, containing enzyme mixture obtained by filtration or centrifugation, or an aqueous extract of the enzyme mixture obtained by redissolving crude solvent precipitated enzyme mixture. Amylase is removed by solvent fractionation in the presence of a calcium salt or by ammonium sulfate fractionation followed by starch adsorption in the presence of aqueous ethanol to remove the last traces of amylase. Pigment is removed by adsorption using a cellulose or other anion exchange resins. The two proteases remaining in solution are fractionated by selective adsorption employing hydroxylapatite as the adsorbent. The neutral protease is adsorbed and subsequently eluted wherein the alkaline protease is unadsorbed.

The amount of enzymatically active substance per gram of the effervescent composition should be an amount sufficient to retard or reduce plaque. Generally, this is an amount to provide from about 1,000 casein units of neutral protease activity to about 60,000 casein units of neutral protease activity per gram of the composition, preferably from about 3,000 casein units of neutral protease activity to about 40,000 casein units of neutral protease activity per gram of the composition and more preferably from about 5,000 casein units of neutral protease activity to about 15,000 casein units of neutral protease activity per gram of the composition. If alkaline protease is employed in compositions of the present invention, the enzymatically active substance is present in an amount to provide from about 150 casein units of alkaline protease activity to about 9,000 casein units of alkaline protease activity per gram of the composition, preferably from about 550 casein units of alkaline protease activity to about 6,000 casein units of alkaline protease activity per gram of the composition and more preferably from about 750 casein units of alkaline protease activity to about 2,250 casein units of alkaline protease activity per gram of the composition. If the compositions of the present invention employ amylase, the enzymatically active substance is present in an amount to provide from about 150 units of amylase activity to about 9,000 units of amylase activity per gram of the composition, preferably from about 550 units of amylase activity to about 6,000 units of amylase activity per gram of the composition, and more preferably from about 750 units of amylase activity to about 2,250 units of amylase activity per gram of the composition.

The acidulating agent utilized in the practice of this invention is pharmaceutically-acceptable, that is, an agent which is a pharmaceutically acceptable solid organic acid, acid salt or mixtures thereof and is palatable and free from adverse effect on the consumer at the level of ordinary use. Examples of acidulating agents which are successfully employed include organic food acids such as tartaric acid, citric acid, fumaric acid, adipic acid, maleic acid and succinic acid. Illustrative acid salts include the salts of commonly used organic food acids such as monosodium citrate, disodium, citrate, potassium acid tartrate and potassium bitartrate; the mono alkali metal phosphates such as monosodium phosphate and monopotassium phosphate and other salts such as monoammonium phosphate and ammonium biphosphate.

The carbonate-containing materials which may be employed in practicing the present invention are compounds which react with acidulating agents with the release of carbon dioxide when contacted with sufficient water. These carbonates must also be pharmaceutically acceptable and include ammonium carbonate, ammonium bicarbonate, ammonium sesquicarbonate, magnesium carbonate, calcium carbonate and more particularly the alkali metal carbonate materials, such as sodium carbonate, sodium bicarbonate, sodium sesquicarbonate, potassium carbonate, potassium bicarbonate including mixtures of these.

In general, amounts of the acidulating agent and carbonate-containing material to prepare composition of the present invention may vary depending upon, inter alia, desired degree of effervescence, other additives used and the like; however, amounts of the acidulating agent acid to carbonate-containing material on a weight ratio basis of from about 3:1 to 1:3 are usually sufficient and provide a pH of from about 5 to about 9 when 1% of the composition is dissolved in water at 25° C.

The invention is not to be limited to any particular method of preparing the effervescent dental composition. The acidulating agent may be mechanically mixed with the other additives, such as the carbonate-containing material and the enzyme substance, or added after the enzyme substance and the carbonate material have been thoroughly mixed.

A preferred embodiment of the present invention is an effervescent tablet. The tablet may be prepared by various methods such as, compacting the dry, free-flowing effervescent dental composition in a suitable mold under sufficient pressure in order for the tablet to retain its shape and have sufficient surface and internal strength to withstand ordinary handling and packaging without fracturing or crumbling. Usually, pressures in excess of about 2,000 p.s.i. are suitable and, in general, the pressures need not be in excess of about 20,000 p.s.i., although pressures in excess may, in some instances, be used. Additionally, if desired, lubrication agents or binding agents, such as sugar, acacia, gelatin or lactose may be used in order to prepare the compositions in tablet form. The tablets of the present invention may be made of various shapes and sizes depending upon the particular purpose for which they may be used.

Another preferred embodiment is a granular effervescent dental composition having a particle size so that 90% will pass through a No. 20 mesh U.S. standard screen.

The effervescent dental compositions of the present invention are generally effective when used in water in an amount of about 0.5 to about 4 grams. Generally, when utilized as a mouthwash, the amount of water is from about 2 to about 12 ounces, preferably from about 4 to about 6 ounces.

The effervescent dental composition may also be employed with water pulsating apparatuses used for oral hygiene.

The following examples are submitted to illustrate and not to limit this invention. All parts are given by weight percent of the total composition unless otherwise stated.

EXAMPLE I

A dental tablet is prepared containing an enzymatically active substance produced by *B. subtilis* NRRL B–3411 in accordance with the teaching of U.S. Pat. 3,031,380 in an amount to provide about 8,000 casein units of activity of neutral protease, 1,500 casein units of activity of alkaline protease and about 1,500 units of activity of amylase per gram of the effervescent dental tablet. The tablets additionally contained the following:

| | Percent |
|---|---|
| Sodium bicarbonate U.S.P. | 38.0 |
| Saccharin | 0.1 |
| Flavor | 2.0 |
| Vegetable oil | 1.0 |
| Lubricant | 0.1 |
| Monosodium phosphate anhydrous U.S.P. | Balance |
| Total | 100 |

The tablets are prepared by blending the above additives for about 20 minutes and then pressing the admixed formulation into a suitable mold at pressures of about 5,000 p.s.i. to produce tablets weighing about 1 gram.

The above procedure was followed to prepare a 5,000 gram blend of the ingredients in the stated proportions which was then pressed into effervescent tablets producing about 5,000 tablets weighing 1 gram having a ½" diameter and a hardness of 3.5 kg./sq. in. Immediately after preparation, 3 tablets were checked for activity, each contained on the average about 7,000 casein units of neutral protease activity, 1,500 casein units of alkaline protease activity and 1,500 units of amylase activity. After storage at room temperature (20° C.) for 90 days each tablet contained on the average about 6,100 casein units of neutral protease activity, 1,500 casein units of alkaline protease activity and 1,500 units of amylase activity.

Other dental tablets are prepared by following the procedure set forth in Example I with equally good results, for example, an enzymatically active substance produced by B. subtilis NRRL 644 is substituted for that used in Example I, in an amount to provide the same activity per gram of the composition, in another example, an enzymatically active substance produced by B. subtilis IAM 1523 is substituted for that used in Example I in an amount to provide the same activity per gram of the composition, in still another example, an enzymatically active substance produced by B. Thermoproteolyticus is substituted for that used in Example I in an amount to provide the same activity per gram of the composition and in a still further example, potassium bicarbonate is substituted in exactly the same amount for the sodium carbonate used.

EXAMPLE II

A dental tablet containing an enzymatically active substance in an amount to provide about 8,000 casein units of activity of neutral protease per gram of the dental tablet is prepared. The tablet additionally contained the following:

| | Percent |
|---|---|
| Sodium bicarbonate U.S.P. | 38.0 |
| Saccharin | 0.1 |
| Flavor | 2.0 |
| Vegetable oil | 1.0 |
| Lubricant | 0.1 |
| Monosodium phosphate anhydrous U.S.P. | Balance |
| Total | 100 |

Tablets are prepared by blending the above ingredients for about 20 minutes and then pressing the admixed formulation into a suitable mold at pressures at about 5,000 p.s.i. for about 3 minutes to produce tablets weighing about 1.0 grams.

Neutral protease is obtained by inoculating a culture of B. subtilis NRRL No. 3411 into a sterile slurry of grains and other nutrient material (such as rice bran, cornmeal, fish meal, wheat bran, Enzose (about 50–80% dextrose and the balance higher saccharides, being the dried mother liquor remaining from dextrose manufacture by enzymatic hydrolysis of corn starch), distillers solubles, corn steep liquor, etc.) containing protein, carbohydrate, minerals, and growth factors, the vessel is agitated and aerated by bubbling sterile air through the inoculated slurry. The pH may be controlled or left to achieve its own natural pH. Aliquots of the beer are removed for assay at various times and, when enzyme production is apparently a maximum, the growth is terminated then, nine (9) liters of fermentation beer are clarified by centrifugation and then stirred with 200 gram DEAE - cellulose (diethyl-aminoethyl cellulose, acetate form pH 6.4) at pH 6.4 for 30 minutes to remove some of the pigment. The cellulose resin is removed by filtration and the filtrate re-treated with a further 100 gm. of DEAE-cellulose in the same way. 80 gm. calcium acetate are added to the 8-liter filtrate, the pH adjusted to 7.5 and 2,240 grams of ammonium sulfate added with stirring. After stirring at 5° C. for 30 minutes, the precipitate is removed by filtration and a further 900 gm. ammonium sulfate is added to the supernatant and the precipitate collected by centrifugation and redissolved in about 1 liter 0.1% calcium acetate solution. 100 gm. powdered wheat starch and 120 ml. ethanol are added, the suspension stirred for 20 minutes and filtered. 2 liters cold (5°) acetone is added to the filtrate and the precipitate collected by centrifugation, redissolved in 500 ml. of 0.1% calcium acetate and lyophilized.

Two hundred fifty mg. of this partially purified enzyme-containing solid is dissolved in 25 ml. 0.02% calcium acetate solution, the pH adjusted to 7.2 and the solution applied to a 1.2 x 7.0 cm. column of hydroxylapatite, washed with 0.1% calcium acetate. After the enzyme solution is washed onto the column with a little calcium acetate solution, the column is eluted with 0.2 M phosphate buffer pH 7.0. The protein material eluted (monitored by absorbence at 280 mm.) is dialyzed at 5° against 0.1% calcium acetate solution overnight, centrifuged and lyophilized.

The above procedure was followed yielding 17 grams of partially purified enzyme-containing solid. Ten 250 mg. portions of this solid were purified employing the hydroxylapatite in the manner indicated yielding about 570 mg. of neutral protease having about $12.5 \times 10^6$ casein units per gram of activity. The neutral protease was then added to a 2,000 gram batch of the above mentioned tablet ingredients in the stated proportions and the blend pressed into 2,000 1 gram tablets in the manner as set forth above for Example II.

Substantially similar results may be obtained by following the procedure set forth for Example II, by substituting a neutral protease produced by either Streptomyces griseus or B. subtilis var amylosaccharificus for the enzymatically active substance used in Example II in an amount to provide the same activity per gram of the composition.

It is to be understood that the following claim constitutes a part of the description of the present invention and consequently are to be considered as such.

What is claimed is:

1. A tablet which comprises a pharmaceutically acceptable solid carbonate containing material, a pharmaceutically acceptable solid acidulating agent selected from the group consisting of food grade organic acids, acid salts thereof, mono-alkali metal phosphates, mono-ammonium phosphates and ammonium biphosphates and a neutral protease, said carbonate containing material and the said acidulating agent being in a weight ratio of from about 3:1 to about 1:3, said neutral protease being produced by inoculating a nutrient medium with a culture of B. subtillis, maintaining said inoculated medium at a suitable temperature for a suitable period of time, separating therefrom enzyme products having a neutral protease activity of at least about 700,000 to about 2,000,000 casein units of activity per gram, being present to provide from about 5,000 to about 15,000 casein units of neutral protease activity per gram of said tablet, said neutral protease being essentially stable in said tablet.

References Cited

UNITED STATES PATENTS

| | | | |
|---|---|---|---|
| 1,262,888 | 4/1918 | Westlake | 424—44 |
| 3,194,738 | 7/1965 | Harrisson et al. | 424—50 |

OTHER REFERENCES

Molle, J. Southern California State Dental Association, vol. 35, pages 391–395, September, 1967.

RICHARD L. HUFF, Primary Examiner

U.S. Cl. X.R.

424—94